United States Patent [19]

Benton

[11] 4,148,226
[45] Apr. 10, 1979

[54] BALL NUT AND SCREW ASSEMBLY
[75] Inventor: Robert L. Benton, Bay City, Mich.
[73] Assignee: General Motors Corporation, Detroit, Mich.
[21] Appl. No.: 835,735
[22] Filed: Sep. 22, 1977
[51] Int. Cl.$^2$ ............... F16H 55/22; F16H 27/02
[52] U.S. Cl. ................................. 74/459; 74/89.15
[58] Field of Search ............ 74/459, 424.8 R, 499, 74/89.15, 441

[56] References Cited

U.S. PATENT DOCUMENTS

| 476,304 | 6/1892 | Pratt | 74/459 |
|---|---|---|---|
| 3,170,336 | 2/1965 | Bohnhuff | 74/424.8 R |
| 3,826,153 | 7/1974 | Sheppard | 74/459 |

Primary Examiner—Leonard H. Gerin
Attorney, Agent, or Firm—Charles R. White

[57] ABSTRACT

Ball nut and screw are grooved to form helical race for an endless train of balls that circulate through the assembly. Leading and trailing turns of the race are connected by a return passage which includes an intermediate passage extending longitudinally of the nut. Special guide tracks in end sections of the ball nut have radially relieved paths, which allow high speed balls acted upon by centrifugal forces to travel along the outer surface thereof to avoid mechanical pick up to provide for smooth vibration-free linear movement of the ball nut along the rotating screw.

2 Claims, 5 Drawing Figures

BALL NUT AND SCREW ASSEMBLY

This invention relates to drive mechanisms and more particularly to a ball nut and screw assembly with a new and improved ball track to optimize operation of the ball train of the assembly for the smooth and noise free translation of a ball nut housing along a drive screw.

Prior to the present invention various drive interconnections have been provided by ball nut and screw assemblies to convert rotary input into linear travel. Generally these assemblies are comprised of an elongated rotatable screw drivingly connected to a nut by an endless train of balls circulating through a ball path which includes a helical internal ball track formed between the screw and nut. Such assemblies further include helical cuts or finger-like protuberances in end sections on opposite ends of the nut to mechanically pick up and guide the ball train from the exit of the helical ball track into a return path through the nut back to the opposite or return end section. On reaching the return end section the balls of the train are delivered back into the helical ball track by the helical cut or protuberance formed therein.

While these prior art assemblies are generally suitable for a wide range of uses, their ball tracks or paths are restricted or encumbered by mechanical pick ups or special grooves to such an extent that vibration and excessive noise are often generated as the balls circulate. This detracts from use of such assemblies in numerous applications such as X-ray scanners where extremely smooth travel of the scanning equipment at various speeds is desirable for sharp pictures.

With the foregoing in mind, the present invention provides a ball nut and screw assembly having new and improved ball return passage system disposed at opposite ends of the ball nut housing. This end return system is provided by an improved ball feed or guide track that takes advantage of the natural tendency of the balls to follow a tangential path when leaving the helical race and utilizes centrifugal forces inherent in such devices when operated at sufficient speeds to hold the balls against the outer extremity of their tracks on exiting from the screw. With this ball track arrangement, mechanical pick up of high speed balls is avoided and ball train circulation is smoother to provide for smooth, vibration-free travel of the nut.

The end return system of the preferred embodiment of this invention has a radially extending exit track formed in the nut housing which is not helical that allows each ball exiting from the nut to move radially out of the helical track until it is centered on the helical land of the screw. A spiral-like ball lift passage or tunnel formed in the deflector and guide plate has an entrance hole which receives the exiting ball from the land. From this entrance hole the spiral ball lift passage guides the ball radially outwardly from the screw to a 90° turn where it is subsequently fed into a longitudinal return passage extending through the nut.

As the balls exit from the return passage the end return system on the opposite end of the nut, being substantially the same as that described above, smoothly feeds the balls to the first turn of the helical race. The entrance hole which fits over the land provides a positive mechanical pick up for low speed balls. High speed balls under the influence of centrifugals travel along the outer surface of the guide track and do not contact the pick up so that vibration is not consequently induced.

It is an object, feature and advantage of this invention to provide a new and improved ball track for a ball nut and screw assembly in which pick up surfaces for high speed balls are eliminated with balls being spun off of the screw by centrifugal force into special radial end paths for recirculation with reduced vibration and noise.

It is another object, feature and advantage of this invention to provide a new and improved ball nut and screw assembly in which the nut has an end return system with a ball exit track relieved to extend radially from the last turn of the helical race to the land of the screw and further in which the nut has deflector and guide plate means with a ball lift track leading from the land to a guide passage through the nut to provide a track allowing the balls to radially leave the screw and in a natural manner to avoid mechanical pick up so that vibration is not induced.

Other objects, features and advantages of this invention will be apparent from the following detailed description and drawings in which.

Figure 1:
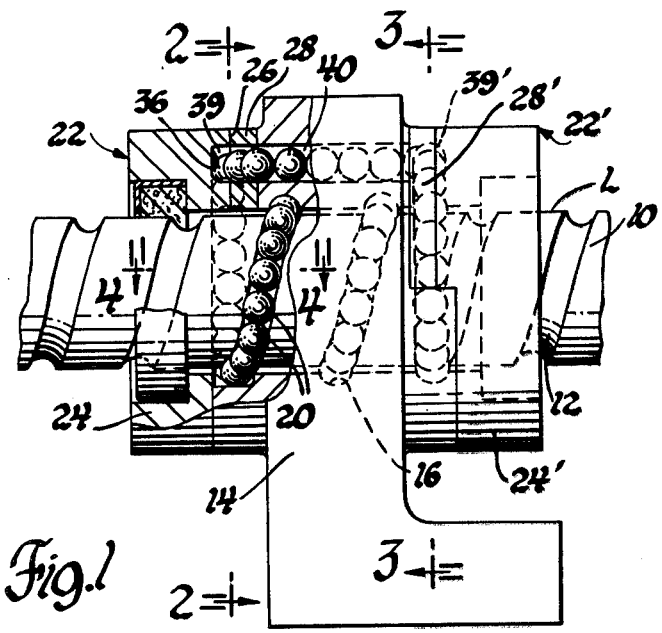
FIG. 1 is a side elevational view partly in section of a ball nut and screw assembly according to this invention.

In FIG. 1 an elongated screw 10 is shown with a single lead provided by helical groove 12. A ball nut housing 14 carried by the screw 10 is provided with an internal helical groove 16 that complements groove 12 to form a helical race for a ball train comprised of a series of balls 20. The balls 20 provide the drive connection between the ball nut housing and screw so that a clockwise rotation of the screw (FIG. 2) will activate the ball train and linearly move the ball nut housing to the right (FIG. 1) while a counterclockwise rotation of the screw will linearly move the ball nut housing leftwardly.

Figure 5:
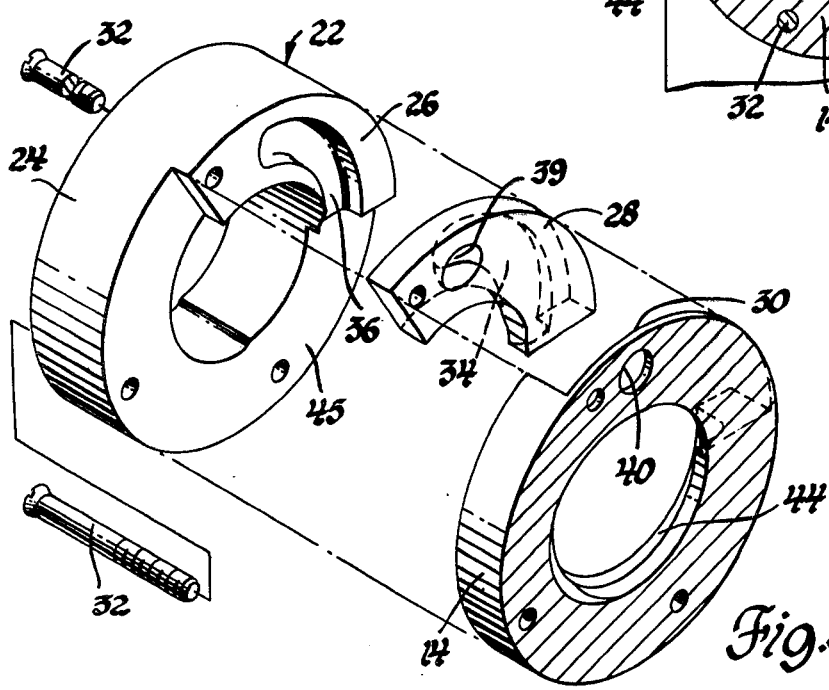
FIG. 5 is an exploded isometric view of an end portion of the ball nut assembly of this invention.

At opposite ends of the ball nut housing 14 are identical ball return fixtures 22 and 22' which are substantially identical so that only fixture 22 is described in particular detail. Return fixture 22 comprises a deflector plate 24 that is generally torrodial in formation but has an inwardly extending arcuate segment 26. Matching arcuate segment 26 is a complementary arcuate guide plate 28 which combines with the segment 26 to closely fit into an arcuate recess 30 formed in the cylindrical body of the ball nut housing 14. Threaded fasteners such as screws 32 are employed to secure the deflector and guide plates to the ball nut housing. The guide plate 28 and deflector plate 24 have cooperating grooves 34 and 36 (FIG. 5) to form a radial and outwardly spiraling tunnel 38. On clockwise rotation of screw 10 of FIG. 2, tunnel 38 guides the balls of the train from the helical land L of screw 10 radially outwardly and then through a 90° turn 39 into an intermediate passage 40 extending longitudinally through the ball nut housing.

Figure 2:
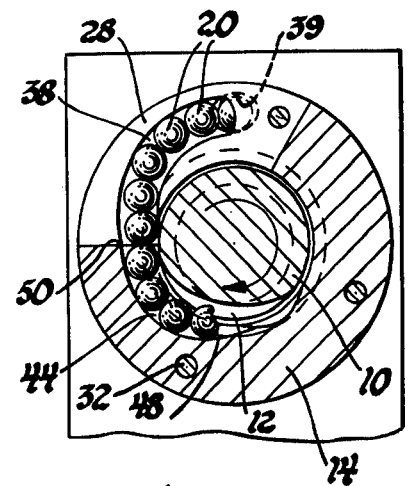
FIG. 2 is a sectional view taken along line 2—2 of FIG. 1.
Figure 4:
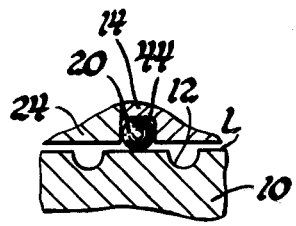
FIG. 4 is a sectional view of a fragment of the assembly taken along lines 4—4 of FIG. 1.
Figure 3:
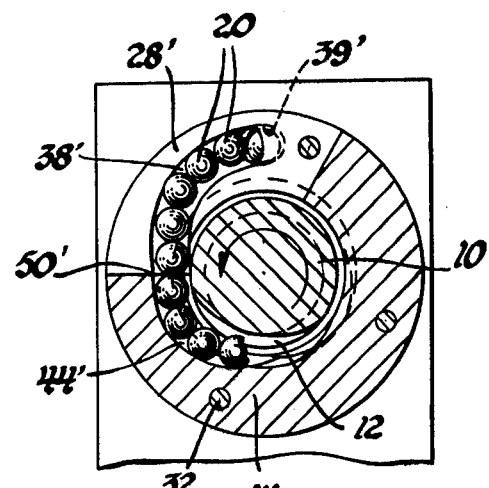
FIG. 3 is a sectional view taken along lines 3—3 of FIG. 1.

The balls of the train are delivered to the land of screw 10 by a special guide or feed track described below. As best shown in FIG. 2, the end turn of helical race leads into a radially disposed guide track 44 formed in the ball nut housing and having its outboard sidewall formed by an inner radial and flat surface 45 of deflector plate 24. Having no lead this guide track is non-helical since it is desired to serially move the balls 20 tangentially along a short path from the helical path onto the land L of the screw. More particularly, the outer surface of the guide track 44 is radially relieved outwardly from point 48, a point of cam relief, to a terminal point 50 which is always above the land L of the screw as the ball nut housing moves along the screw. The balls being acted upon by centrifugals of predetermined magnitude will be spun tangentially from the leading end turn of the helical race and will follow a natural unobstructed path in moving to the point of departure from the screw or terminal point 50. As indicated above the balls are subsequently fed into the entrance of tunnel 38 and through its outwardly spiraling track and 90° turn 39 into intermediate passage 40. The lower half of the entrance hole of tunnel 38 which fits over the land L does not allow a low speed ball to follow the screw. A high speed ball however will travel along the outer surface of the guide track and tunnel without contact of the pick up.

Balls 20 exiting from intermediate passage 40 enter the 90° turn 30' and inwardly directed tunnel 38' formed in the guide plate 28' and deflector plate 24' of return fixture 22'. Balls exiting from tunnel 38' are smoothly fed into the start or trailing end turn of the helical race by the radially relieved guide track 44' in the ball nut housing.

Assuming that the screw 10 is being turned or driven in a counterclockwise direction in FIGS. 1 and 2, for translation of the ball nut housing 14 to the left the balls will circulate in an opposite direction and the action of the assembly will be opposite to that described above. When the balls 20 exit from the helical race they are centrifugally spun from the leading end turn into guide track 44' and onto the land of screw 10. From this station the balls are lifted radially outwardly from the screw by tunnel 38' and fed by intermediate passage 40 into end fixture 22 for smooth delivery back to the trailing end turn of the helical groove.

From the above it will be understood that the ball recirculation system of this invention has provided reduced vibration and noise as compared to prior systems. This is accomplished by having radial exit tracks in the nut transverse to the longitudinal axis of the screw that allow high speed balls to take a free path in exiting from the ball nut and operate against points of tangency instead of against mechanical pick ups and deflector walls. The entrance hole in the deflector and guide plate at point 50 fits over the land of the screw does not allow the ball to follow the screw and from this point the balls are moved longitudinally from the screw.

This invention is not limited to the details of the construction shown and described for purposes of illustrating the invention for other modifications will occur to those skilled in the art.

I claim:

1. In a ball nut and screw assembly, an elongated screw having a helical groove extending along the outer peripheral surface thereof, a helical land interposed between the turns of said helical groove, a nut having an internal helical groove mounted on said screw, said helical grooves of said screw and nut being matched with each other to provide a helical race having a plurality of turns, a train of balls operatively mounted in said assembly and extending through said race to provide a drive connection between said nut and screw, an intermediate passage for said train of balls traversing the longitudinal dimension of said nut, said nut having guide track means for said train of balls formed in opposite ends thereof, each said guide track means extending radially outwardly from an associated end turn of said helical groove of said nut and terminating on said land of said screw, ball return fixture means secured to each end of said nut, each said ball return fixture means having radial and outwardly spiraling tunnel means for said train of balls leading from the end of said guide track means associated therewith to an associated end of said intermediate passage, said guide track means and said tunnel means forming ball passage means originating in said nut at a point of tangency with an associated end turn of said helical race and extending radially outwardly in a plane transverse to the longitudinal axis of said screw to an associated end of said intermediate passage to permit said train of balls to continuously circulate through said helical race and exit radially against the outer wall of one of said guide track means and away from said end turn of said helical groove of said screw for the smooth linear movement of said ball nut in response to rotation of said screw.

2. In a ball nut and screw assembly, an elongated screw having a helical groove extending along the outer peripheral surface thereof, a helical land interposed between the turns of said helical groove, a nut having an internal helical groove mounted on said screw, said helical grooves of said screw and nut being matched with each other to provide a helical race having a plurality of turns, a train of balls operatively mounted in said assembly and extendng through said race to provide a drive connection between said nut and screw, an intermediate passage for said train of balls traversing the longitudinal dimension of said nut, said nut having integral guide track means formed at either end thereof, each said guide track means having zero lead and extending in an arc outwardly from an associated end turn of said helical race to an exit point on said land of said screw, ball return fixture means secured to each end of said nut, each said ball return fixture means having radial and outwardly spiraling tunnel means formed therein leading from said exit point of said guide track means associated therewith to corresponding end of said intermediate passage, said guide track means and said tunnel means forming ball passage means originating in said nut at a point of tangency with an end turn of said helical race and extending radially outwardly in a plane transverse to the longitudinal axis of said screw to an associated end of said intermediate passage to permit said train of balls to continuously circulate through said helical race and exit radially against the outer wall of one of said guide track means and away from said end turn of said helical groove associated therewith and into said intermediate passage for the smooth linear movement of said ball nut in response to rotation of said screw.

* * * * *